United States Patent [19]

Umemoto

[11] Patent Number: 5,479,148
[45] Date of Patent: Dec. 26, 1995

[54] REMOTE CONTROLLER FOR SECURITY SYSTEM

[75] Inventor: Tosiaki Umemoto, Iwaki, Japan

[73] Assignee: Alpine Electronics, Inc., Tokyo, Japan

[21] Appl. No.: 24,873

[22] Filed: Mar. 1, 1993

Related U.S. Application Data

[63] Continuation of Ser. No. 841,224, Feb. 21, 1992, abandoned, which is a continuation of Ser. No. 596,153, Oct. 11, 1990, abandoned.

[30] Foreign Application Priority Data

Oct. 12, 1989 [JP] Japan .................................. 1-265967

[51] Int. Cl.⁶ .................................................. G08C 17/02
[52] U.S. Cl. ................ 340/539; 340/825.69; 340/825.72; 340/825.5; 340/426; 341/176
[58] Field of Search ............................ 368/251; 455/151, 455/152; 340/425.5, 426, 505, 506, 531, 536, 525, 825.72, 528, 527, 825.69, 825.83, 825.06, 825.5, 825.22, 825.31, 539, 176; 341/176

[56] References Cited

U.S. PATENT DOCUMENTS

| | | | |
|---|---|---|---|
| 4,383,242 | 5/1983 | Sassover et al. | 307/10.5 |
| 4,494,114 | 1/1985 | Kaish | 340/426 |
| 4,567,472 | 1/1986 | Shirai et al. | 340/426 |
| 4,573,046 | 2/1986 | Pinnow | 341/30 |
| 4,665,397 | 5/1987 | Pinnow | 340/825.72 |
| 4,670,746 | 6/1987 | Taniguchi et al. | 70/257 |
| 4,672,375 | 6/1987 | Mochida et al. | 180/287 |
| 4,679,026 | 7/1987 | Knakowski et al. | 340/426 |
| 4,683,462 | 7/1987 | Takeda et al. | 340/571 |
| 4,691,801 | 9/1987 | Mann et al. | 340/426 |
| 4,754,255 | 6/1988 | Sanders et al. | 340/528 |
| 4,794,268 | 12/1988 | Nakano et al. | 340/825.31 |
| 4,794,368 | 12/1988 | Grosshelm et al. | 340/528 |
| 4,866,417 | 9/1989 | DeFino et al. | 340/429 |
| 4,887,064 | 12/1989 | Drori et al. | 340/426 |
| 4,890,108 | 12/1989 | Drori et al. | 340/825.69 |
| 4,897,630 | 1/1990 | Nykerk | 340/426 |
| 4,908,604 | 3/1990 | Jacob | 340/539 |
| 4,940,964 | 7/1990 | Dao | 340/825.69 |
| 5,049,867 | 7/1991 | Stouffer | 340/426 |
| 5,055,701 | 10/1991 | Takeuchi | 340/825.69 |
| 5,103,221 | 4/1992 | Memmola | 340/825.69 |
| 5,146,215 | 9/1992 | Drori | 340/825.72 |

FOREIGN PATENT DOCUMENTS

| | | |
|---|---|---|
| 89402143 | 7/1989 | European Pat. Off. . |
| 60-188579 | 8/1985 | Japan . |
| 2051442 | 3/1980 | United Kingdom . |

*Primary Examiner*—John K. Peng
*Assistant Examiner*—Daniel J. Wu
*Attorney, Agent, or Firm*—Guy W. Shoup; Patrick T. Bever

[57] ABSTRACT

A remote controller for a security system that allows the programming of data regarding security actions which may be performed by a given group of local security units installed in a given set of automobiles. The remote controller allows setting and storing of data corresponding to each of the automobiles, and transmission of the stored data. When a particular local security unit is to be armed or disarmed, the automobile equipped with the unit is specified and the set data corresponding to the specified automobile is transmitted to the particular local security unit together with a command to arm or disarm the unit. Then, the unit performs security actions in accordance with the settings indicated by the control data.

10 Claims, 6 Drawing Sheets

REMOTE CONTROLLER FOR SECURITY SYSTEM

This application is a continuation of a application Ser. No. 07/841,224, filed Feb. 21, 1992, now abandoned, which is a continuation of Ser. No. 07/596,153, filed Oct. 11, 1990, now abandoned.

BACKGROUND OF THE INVENTION

1. Field of the Invention

The present invention relates to a remote controller for a security system and, more particularly, to a security system remote-controller that allows the programming of various data regarding security actions which may be performed by the system.

2. Description of the Related Art

An anti-theft device (security system) of an automobile serves to prevent the automobile from being stolen. For instance, if a would-be burglar opens a door or trunk, the activated system gives a considerable shock to the automobile, sounds a siren, repeatedly turns on and off the headlights, and/or effects a starter cut (i.e., an action to disable the engine start) so as to render the driving of the automobile impossible.

Among such security systems, there is a type which includes a portable remote controller and a local security unit to be installed in a particular automobile. The remote controller can command from a remote location the start or termination of the local security unit (i.e., should be armed or disarmed). The remote controller may remote-control the arming and disarming of a plurality of local security units installed in a plurality of automobiles. In this case, the remote controller is provided with certain keys which are operated to issue a command to arm or disarm the unit in a particular automobile among the set of automobiles, and to specify the particular automobile.

In a remote-controlled security system, it is possible to program various data regarding security actions which may be performed by the system. Such data is suitably set with respect to each particular local security unit (and automobile) concerned. For instance, data concerning the following factors may be set:

(a) data indicating whether or not a siren is to be sounded when a would-be burglar intrudes (hereinafter referred to as "siren on/off data");

(b) data indicating whether an intrusion is to be determined on the basis of a single input from a sensor which has sensed an abnormality or on the basis of at least two inputs from such sensors (hereinafter referred to as "sensor scanning on/off data"); and (c) data indicating whether or not a horn is to be sounded in response to an arming or disarming command (hereinafter referred to as "beep on/off data"). The local security unit performs security actions in accordance with the settings. These settings make it possible to restrain sirens from being sounded too many times, or to vary the sensitivity with which an abnormality is sensed.

The conventional remote-controlled security system entails a problem, however, when there are a plurality of local security units. Because programming data must be performed by setting the local security unit in each and every automobile, the operation is very time-consuming and tedious.

SUMMARY OF THE INVENTION

An object of the present invention is to provide a remote controller for a security system that allows the programming of data regarding security actions (such as siren on/off data, sensor scanning on/off data and beep on/off data) which may be performed by the system.

To this end, according to the present invention, a remote controller for a security system comprises: means for programming data for a given group of local security units which are installed in a given set of automobiles; means for storing the set data in correspondence with each of the automobiles; and means for transmitting, to the local security unit installed in a specified automobile, the set data corresponding to the specified automobile together with data commanding an arming or disarming of the particular local security unit.

With this construction, the remote controller operates as follows. Various data regarding security actions (such as siren on/off data, sensor scanning on/off data and beep on/off data) are set by operating the remote controller, then stored in memory incorporated in the remote controller in correspondence with each of the automobiles. When a particular local security unit is to be armed or disarmed, the automobile equipped with the particular unit is specified through a key operation, and the set data corresponding to the specified automobile are transmitted to the particular local security unit together with a command to arm or disarm the unit. Then, the unit performs security actions in accordance with the settings indicated by the control data.

DESCRIPTION OF THE PREFERRED EMBODIMENT

Figure 1:
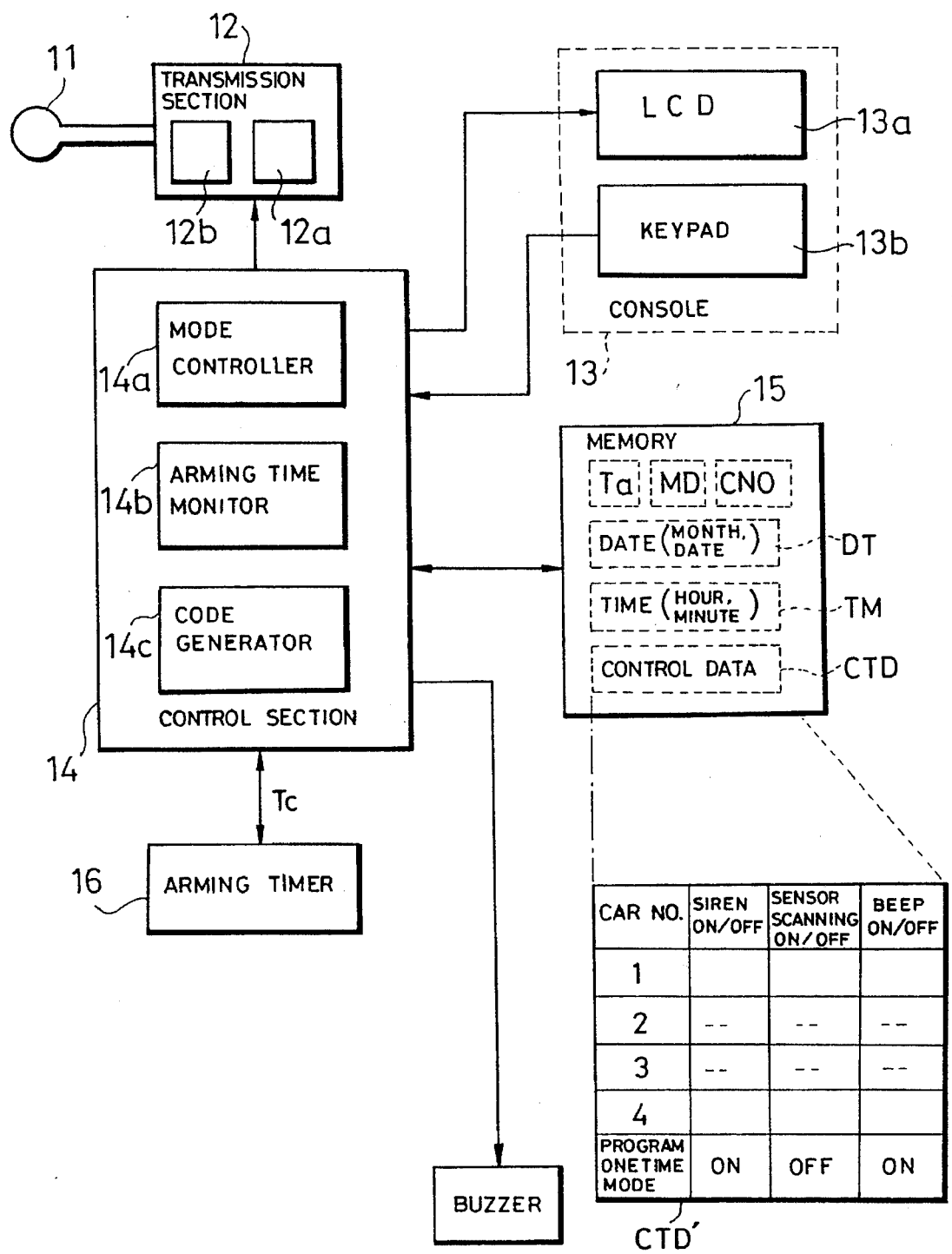
FIG. 1 is a block diagram of a remote controller for a security system in accordance with the present invention.

Referring to FIG. 1, the remote controller includes a loop antenna 11, a transmission section 12 having a modulating circuit 12a for amplitude-modulating the input codes with a carrier of a predetermined frequency, and an LC oscillating circuit 12b for performing power amplification of the modulated signal and radiating the electric wave through the loop antenna connected for transmission. The remote controller also includes a console 13 having a liquid crystal display (LCD) 13a for displaying such information as the date, the time, the mode and an alarm time, and a keypad 13b with various keys.

Reference numeral 14 denotes a control section having a mode controller 14a, an arming time monitor 14b and a code generator 14c. The mode controller 14a sets the state (mode) in which the remote controller operates, and controls the operation of the remote controller in the set mode. The arming time monitor 14b keeps track of the time that has passed after an arming to check whether this post-arming time has reached a prescribed alarm generating time (which is also referred to as "wake-up reminder time"). The code generator 14c inputs data (in code strings) to the modulating circuit 12a of the transmission section 12.

The remote controller further includes a memory 15 for storing data such as the set alarm generating time (wake-up reminder time) Ta, the currently effected mode MD, the number of the specified automobile CNO equipped with the local security unit to be remote-controlled, the data DT (month and date), the time TM (hour and minute), and the set control data CTD.

Control data CTD are set for each of the automobiles involved. CTD include siren on/off data, sensor scanning on/off data, and beep on/off data. When an arming/disarming (TX) key, which is among the various keys in the keypad 13b, is depressed while in program memory mode (to be described later.) The set data CTD that correspond to a particular, separately-specified automobile are read from the memory 15. The read data CTD are then transmitted, together with an arming/disarming (TX) command, to the local security unit installed in the specified automobile. If a program one time mode (also described later) is currently in effect, fixed control data CTD's are transmitted as the control data CTD to a particular local security unit upon the depression of the TX key together with a TX command. The fixed control data CTD' are pre-programmed, fixed data indicating the settings of "siren on" (to sound a siren upon sensing an abnormality), "sensor scanning off" (to determine the occurrence of an abnormality on the basis of a single sensor output), and "beep on" (to sound a horn in response to an arming/disarming command).

Furthermore, the remote controller has an arming timer 16 for measuring the time Tc that has passed after an arming, as well as a buzzer 17 which is activated when the post-arming time has reached the alarm generating time Ta.

Figure 2:
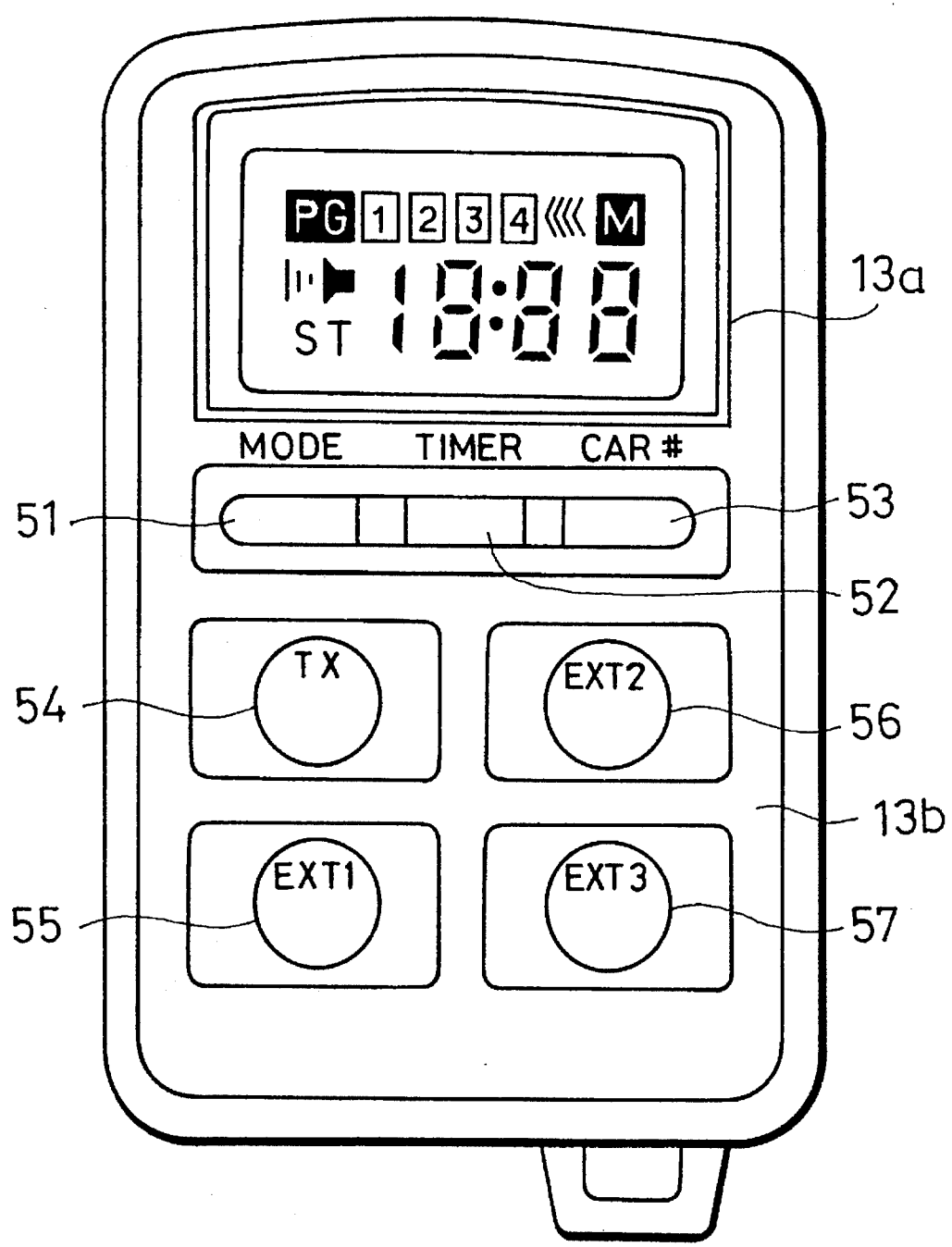
FIG. 2 is a front view of the remote controller showing its exterior appearance.
Figure 3:
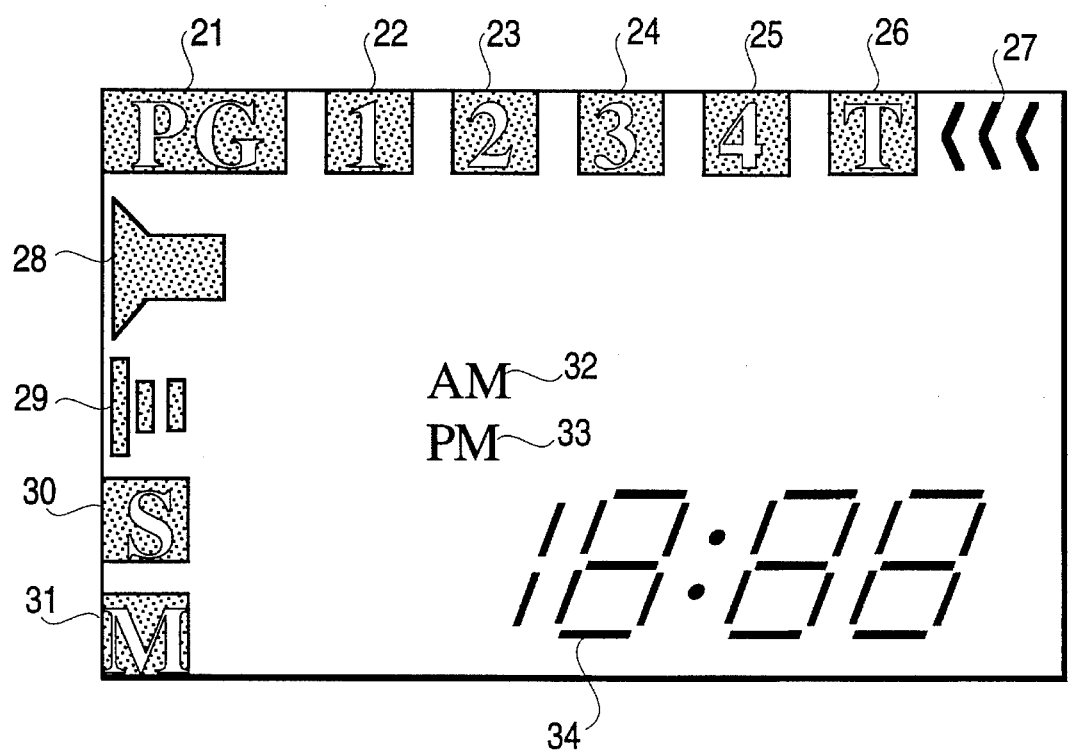
FIG. 3 is a view showing an example of a display on an LED.

The console 13, as shown in FIG. 2, is disposed on the upper surface of the remote controller. The LCD 13a, as shown in detail in FIG. 3, comprises: (1) a program mode indicator 21 for indicating that the remote controller is currently in program mode; (2) first to fourth car indicators 22 to 25 for indicating the numbers of automobiles in the given set of automobiles (the set comprising, e.g., four automobiles numbered "1" to "4") to enable specifying; (3) an arming time indicator 26 for indicating the on/off state of the arming time 16 (when this time is on, it is operating to measure the post-arming time Tc); (4) a warning beep indicator 27 for indicating whether a warning beep sound is to be generated when the post-arming time Tc has reached the alarm generating time Ta; (5) a siren on/off indicator 28 for indicating whether a siren is to be sounded upon the occurrence of an abnormality; (6) a beep on/off indicator 29 for indicating whether a horn is to be sounded in response to an arming or disarming; (7) a sensor scanning on/off indicator 30 for indicating whether the occurrence of an abnormality is to be determined on the basis of a single or at least two sensor outputs; (8) a mode indicator 31 for indicating the setting of either the program one time mode or the program memory mode; (9) a pair of indicators 32 and 33 for indicating whether it is before or after midday; and (10) a time/date indicator 34 for interchangeably indicating the time and the date.

The key portion 13b, as shown in FIG. 2, comprises a mode key 51, a timer key 52, a car number (car #) key 53, the TX key 54 through which an arming or disarming command is issued, and first to third extension (EXT1 to EXT3) keys 55 to 57. The operation of these keys will be described later.

Figure 4:
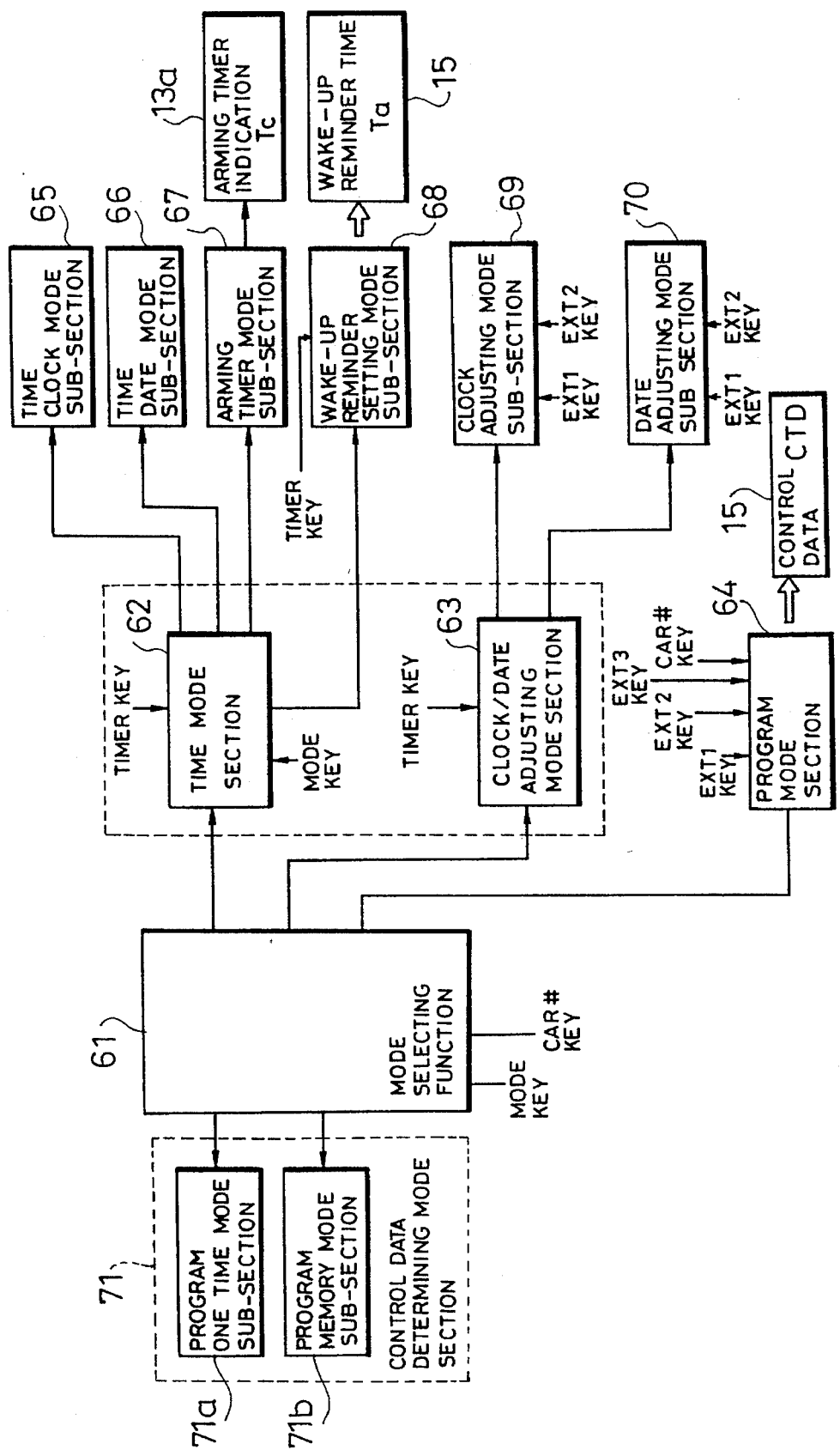
FIG. 4 is a block diagram of a mode controller.

The mode controller 14a is shown in block diagram in FIG. 4. The mode controller 14a includes a mode selecting function 61 connected with a time mode section 62, a clock/date adjusting mode section 63, and a program mode section 64. The time mode section 62 has a time clock mode sub-section 65, a time date mode sub-section 66, an arming timer mode sub-section 67, and a wake-up reminder setting mode sub-section 68. The clock/date adjusting mode section 63 has a clock adjusting mode sub-section 69, and a date adjusting mode sub-section 70. The mode selecting function 61 is also connected with a control data determining mode section 71 having a program one time mode sub-section 71a and a program memory mode sub-section 71b.

Each time the mode key 51 is depressed briefly (for a period of time less than 2 seconds; such a depression will hereinafter be referred to as "brief depression"), the mode selecting function 61 operates to change the operating mode of the remote controller from time mode to program mode, or from program mode to time mode. If the time mode is selected, each time the car # key 53 is depressed for two seconds (such a depression will hereinafter be referred to as "2-second depression"), the mode selecting function 61 operates to change the mode from one of time mode to clock/date adjusting mode and vice versa. Furthermore, the mode selecting function 61 operates, irrespective of whether the set operating mode is time mode or program mode, to change the control data-determining mode from the program one time mode to the program memory mode and vice versa each time the mode key 51 is subjected to a 2-second depression. The control data-determining mode is provided to ascertain the type of control data to be transmitted, upon a depression of the TX key 54, to a particular local security unit together with a TX command. The control data to be transmitted are in the following relation with the control data-determining mode and the operating mode of the remote controller:

(1) If both the program one time mode and the program mode are in effect, control data CTD programmed in the manner described later is transmitted;

(2) If the program one time mode is in effect and, simultaneously, the remote controller is not in the program mode (i.e., it is in the time mode, clock/date adjusting mode, wake-up reminder setting mode or the like), programmed, fixed data CTD' are transmitted; and (3) If the program memory mode is in effect, the programmed control data are transmitted irrespective of whether the operating mode of the remote controller is in the program mode of the time mode.

If the time mode is in effect, each time the timer key 52 is subjected to a brief depression, the time mode section 62 operates to change the mode from the time clock mode, the time date mode or the arming timer mode to another of the three modes. During the time mode, each time the timer key 52 is subjected to a 2-second depression, the time mode section 62 also operates, to set the wake-up reminder setting mode. When the time clock mode is set, the time clock mode sub-section 65 causes the current time to be displayed on the LCD 13a. When the time data mode is set, the time data mode sub-section 66 causes an LCD display of the current date. When the arming timer mode is set, the arming timer mode sub-section 67 causes an LED display of either the post-arming time Tc or the set wake-up reminder time Ta. When the wake-up reminder mode is set, the wake-up reminder mode sub-section 68 causes, upon continuous depression of the time key 52 for at least 2 seconds, a sequential display of alternating values, such as 0:00→

0:15→0:30→0:45→1:00→0:00 . . . When the timer key 52 is released from continuous depression, the displayed value is set as the alarm generating time Ta in the memory 15. Thus, the set wake-up reminder mode is changed to the time clock mode upon either the depression of the mode key 51 or the depression of the timer key 52 for at least 2 seconds.

When the clock/date adjusting mode is set, each time the timer key 52 is depressed, the clock/date adjusting mode section 63 operates to change the mode from the clock adjusting mode to the date adjusting mode or vice versa. When the clock adjusting mode is set, the clock adjusting mode sub-section 69 allows the currently displayed time to be adjusted by increments of "1" the displayed hour value and minute value upon each depression of the first and second extension keys EXT1 and EXT2, respectively. When the date adjusting mode is set, the date adjusting mode sub-section 70 allows the currently displayed date to be adjusted by increments of "1" the displayed month value and the date value upon each depression of the extension keys EXT1 and EXT2, respectively.

When the program mode is set, the program mode section 64 allows control data CTD indicating the settings on siren on/off, sensor scanning on/off and beep on/off to be programmed (set) using the first to third extension keys and the car # key for each of the given set of automobiles, then allows the programmed control data CTD to be stored in the memory 15.

Figure 5:
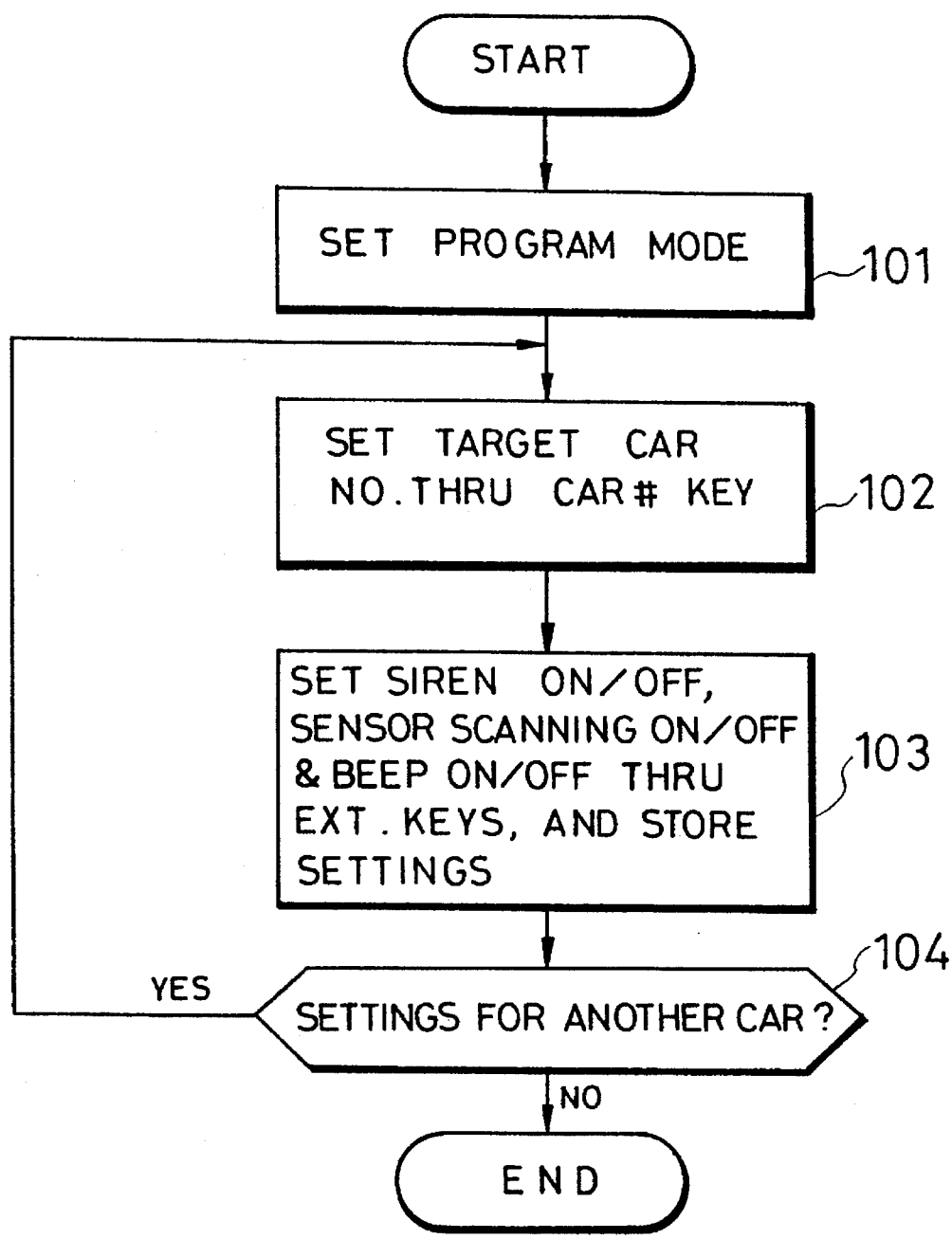
FIG. 5 is a flowchart showing procedures for setting control data.

The procedures for setting the control data will be described with reference to the flowchart in FIG. 5. First, the operating mode of the remote controller is set to the program mode (Step 101). Subsequently, the car # key 53 is briefly depressed to specify the target automobile equipped with the local security unit to be remote-controlled (Step 102). Each time the car # key 53 is briefly depressed, the specified automobile changes among the given set of automobiles with the car indicators 22 to 25 of the LED 13a cyclically changing 1→2→3→4→1 . . . When the number of the target automobile is finally displayed by the corresponding indicator, the first to third extension keys 55 to 57 are operated to program siren on/off data, sensor scanning on/off data and beep on/off data, and then store the programmed data in the memory 15 (Step 103).

Each time the first extension key 55 is depressed, the setting of the siren on/off data alternates between "siren on" and "siren off" until the final setting is made and indicated by the siren on/off indicator 28. Each time the second extension key 56 is depressed, the setting of the sensor scanning on/off data alternates between "sensor scanning on" and "sensor scanning off" until the final setting is made and indicated by the sensor scanning on/off indicator 30. Similarly, each time the third extension key 57 is depressed, the setting of the beep on/off data alternates between "beep on" and "beep off" until the final setting is made and indicated by the beep on/off indicator 29.

When the control data CTD has been set and stored in this way for the specified automobile, it is then determined whether or not the setting of control data is necessary for another automobile (Step 104). If another setting operation is necessary, the procedures in Step 102 et seq. are repeated, whereas, if not, the execution of procedures for setting the control data is terminated.

Figure 6:
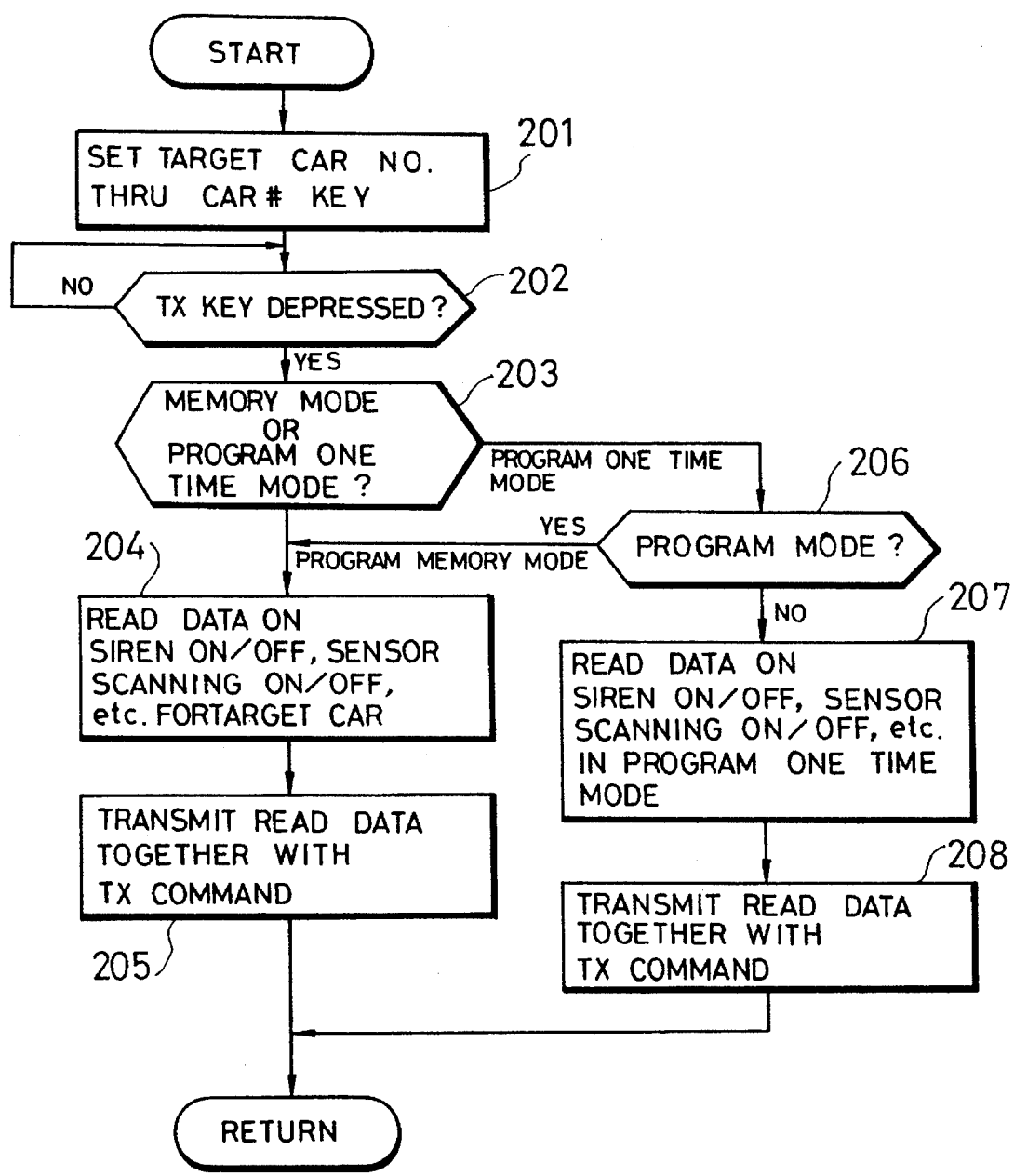
FIG. 6 is a flowchart showing the steps performed by a control data determining mode function upon the depressing of a key for commanding an arming or disarming.

When the program one time mode is in effect as the control data-determining mode, the program one time mode sub-section 71a of the control data determining mode section 71 determines the control data which is to be transmitted together with a TX command. On the other hand, when the program memory mode is selected as the control data-determining mode, the program memory mode sub-section 71b determines the control data which is to be transmitted together with a TX command. The control data-determining mode section 71 operates as shown in the flowchart of the FIG. 6 when the TX key 54 is depressed.

The target automobile equipped with the local security unit to be remote-controlled is specified beforehand through the car # key 53 (Step 201). The number of the specified automobile is indicated by the corresponding car indicator 22 to 25 of the LED 13a.

At this stage, a determination is made as to whether or not the TX key 54 has been depressed for the purpose of arming or disarming (Step 202). When key 54 has been depressed, one checks whether the control data-determining mode in effected is the program one time mode or the program memory mode (Step 203).

If the program memory mode is currently in effect, the control data for the target automobile is read from the memory 15 (Step 204). This read control data is then transmitted, together with the target automobile number and the TX command, to the local security unit installed in the target automobile (Step 205). Each of the local security units installed in the automobiles determines, on the basis of the received automobile number, whether the transmission is addressed to its unit or not. The units which are not addressed do not change their state, whereas, the particular unit that is addressed stores the received control data in memory incorporated therein, and arms or disarms in accordance with the settings indicated by the control data. Whether the commanded local security unit arms or disarms is determined depending on the status of the unit immediately before it receives the TX command; if the unit is armed, it is controlled to become disarmed, whereas, if disarmed, it is controlled to become armed.

On the other hand, if the control data determining mode is found to be the program one time mode in Step 203, a check is made as to whether or not the operating mode of the remote controller is in the program mode (Step 206). If the remote controller is in the program mode, the processes in Step 204 et seq. are executed. If the operating mode is not in the program mode, fixed control data CTD' are read in the program one time mode from the memory 15 (Step 207). Then, the fixed control data CTD' are transmitted to the relevant local security unit together with the target automobile number and the TX command (Step 208).

The fixed control data CTD, indicates certain settings (the "siren on" setting, the "sensor scanning off" setting and the "beep on" setting) which are frequently used under normal circumstances. Therefore, if it is troublesome for the user to program the control data CTD, he may select the program one time mode as the control data determining mode and the time mode as the operating mode. With this condition, when the TX key is depressed, the fixed control data CTD' are transmitted to the local security unit concerned.

The control data may concern factors other than the above-described siren on/off, sensor scanning on/off, and beep on/off.

As described above, according to the present invention, control data regarding security actions which may be performed by the local security units are programmed by the remote controller for each of the automobiles concerned, and the programmed control data are stored in the memory incorporated in the remote controller. When a particular automobile is specified through a key operation and a command to arm or disarm the unit is issued, the control data for the specified automobile are transmitted, together with the arming/disarming command, to the particular unit that unit then performs security actions in accordance with the settings indicated by the control data. Thus, the remote controller facilitates easy programming of data for security actions.

What is claimed is:

1. A portable remote controller for a security system that is adapted to transmit, from a remote location, to a local security unit installed in an automobile, the local security unit being connected to a plurality of security devices located on the automobile said portable remote controller comprising:

means for setting multiple security data signals regarding security actions of said local security unit, wherein each security data signal corresponds to a control state of one of said plurality of security devices;

means for storing the multiple security data signals in said portable remote controller; and means for transmitting to said local security unit the multiple security data signals together with data commanding an arming or disarming of said local security unit, wherein the multiple security data signals and data commanding an arming or disarming are transmitted by sending one or more control signals from the means for transmitting at one time, and wherein a control state of the plurality of control devices is set in said local security unit in response to the multiple security data signals.

2. A security system portable remote controller according to claim 1, further comprising means for displaying a current setting of the multiple security data.

3. A security system portable remote controller according to claim 1, further comprising means for continuously and interchangeably displaying a time of day and a data.

4. A security system remote controller that is adapted to transmit from a remote location to a local security unit installed in an automobile, said remote controller comprising:

means for setting multiple security data regarding security actions of said local security unit;

means for storing the multiple security data;

means for transmitting to said local security unit the multiple security data together with data commanding an arming or disarming of said local security unit;

means for setting a prescribed alarm generating time;

means for measuring a length of time that has passed after an arming of the local security unit;

means for comparing said prescribed alarm generating time to the length of time that has passed after the arming; and means for sounding a buzzer at the location of the remote controller when the length of time that has passed after the arming exceeds said prescribed alarm generating time.

5. A remote controller for a security system including a plurality of local security units installed in a plurality of automobiles, said remote controller being adapted to specify one of the automobiles and transmit, from a remote location, to the local security unit installed in the specified automobile, said remote controller comprising:

means for setting multiple security data regarding security actions of each of said local security units;

means for storing the multiple security data in said remote controller such that the multiple security data for each local security unit is identified as corresponding to the automobile in which that local security unit is installed; and means for transmitting, to the local security unit installed in the specified automobile, the multiple security data corresponding to the specified automobile together with data commanding an arming or disarming of the particular local security unit, wherein the multiple security data corresponding to the specified automobile and data commanding an arming or disarming of the particular local security unit are transmitted by sending one or more control signals from the means for transmitting at one time.

6. A security system remote controller according to claim 1, wherein the security actions include turning on or off a siren connected to the system.

7. A security system remote controller according to claim 1, wherein the security actions including turning on or off a sensor scanning of the security system.

8. A security system remote controller according to claim 1, wherein the security actions include turning on or off a horn connected to the security system.

9. A portable remote controller for a security system that is adapted to transmit, from a remote location, to a local security unit installed in an automobile, the local security unit being connected to a plurality of security devices located on the automobile, said portable remote controller comprising:

means for setting multiple security data signals regarding security actions of said local security unit, wherein each security data signal corresponds to a control state of one of said plurality of security devices;

means for storing the multiple security data signals; and means for transmitting to said local security unit the multiple security data signals together with data commanding an arming or disarming of said local security unit, wherein a sensor scanning operation of the security system is activated or deactivated in response to the multiple security data signals.

10. A remote controller for a security system that is adapted to transmit, from a remote location, to a local security unit installed in an automobile, the local security unit being connected to a plurality of security devices located on the automobile, said remote controller comprising:

means for setting multiple security data signals regarding security actions of said local security unit, wherein each security data signal corresponds to a control state of one of said plurality of security devices, and wherein the security actions include turning on or off a sensor scanning operation of the security system;

means for storing the multiple security data signals in said remote controller; and means for transmitting to said local security unit the multiple security data signals together with data commanding an arming or disarming of said local security unit, wherein the multiple security data signals and data commanding an arming or disarming are transmitted in response to a single activation of the means for transmitting, and wherein a control state of the plurality of control devices is set in said local security unit in response to the multiple security data signals.

* * * * *